United States Patent
Mao

Patent Number: 5,591,548
Date of Patent: Jan. 7, 1997

[54] ELECTRODE MATERIALS FOR RECHARGEABLE ELECTROCHEMICAL CELLS AND METHOD OF MAKING SAME

[75] Inventor: Zhenhua Mao, Coral Springs, Fla.

[73] Assignee: Motorola, Inc., Schaumburg, Ill.

[21] Appl. No.: 464,440

[22] Filed: Jun. 5, 1995

[51] Int. Cl.$^6$ .................................................. H01M 4/02
[52] U.S. Cl. ........................ 429/218; 429/218; 429/221; 429/223; 429/224; 423/593; 423/594
[58] Field of Search ................................... 429/218, 221, 429/223, 224, 188; 423/594, 593

[56] References Cited

U.S. PATENT DOCUMENTS

| | | | |
|---|---|---|---|
| 4,302,518 | 11/1981 | Goodenough et al. | 429/104 |
| 4,357,215 | 11/1982 | Goodenough et al. | 204/2.1 |
| 5,180,574 | 1/1993 | Von Sacken | 423/594 |
| 5,308,720 | 5/1994 | Kurokawa et al. | 429/194 |
| 5,395,711 | 3/1995 | Tahara et al. | 429/197 |

OTHER PUBLICATIONS

HCA abstract 115:53357, 1991 (month /NA).
Electrochemistry and Structural Chemistry of LiNiO$_2$ (R3M) for 4 volt Secondary Lithium Cells, J. Electrochem. Soc. vol. 140, No. 7, Jul. 1993, pp. 1862–1870.

"Lithium Batteries, New Materials Developments and Perspectives" Elservier, New York (1994) pp. 239–280 (month N/A).

Abstract Presented at ECS 1994 Fall Meeting, vol. 94–2, Miami, entitled Electrochemical Studies of LiNiO$_2$ for Lithium–Ion Batteries (month N/A).

*Primary Examiner*—M. Nuzzolillo
*Attorney, Agent, or Firm*—Kenneth M. Massaroni

[57] ABSTRACT

A method for preparing a lithiated transition metal oxide electrochemical charge storage material for use in an electrochemical cell. The cell (10) includes a cathode (20), an anode (30) and an electrolyte (40) disposed therebetween. The method involves the preparation of the lithiated, transition metal oxide material in an inert environment. The materials are characterized by improved electrochemical performance, and an identifiable x-ray diffraction matter.

23 Claims, 5 Drawing Sheets

ELECTRODE MATERIALS FOR RECHARGEABLE ELECTROCHEMICAL CELLS AND METHOD OF MAKING SAME

TECHNICAL FIELD

This invention relates in general to secondary lithium electrochemical cells, and more particularly to secondary lithium batteries having high capacity positive electrodes.

BACKGROUND OF THE INVENTION

Secondary lithium electrochemical cells, and particularly lithium batteries, using an intercalation compound as the positive electrode, or cathode of the battery have been studied intensely during the past decade. Heretofore, the cathode material used in these batteries was typically a lithiated cobalt oxide, nickel oxide, or manganese oxide. Lithiated transition metal oxide batteries are being studied as an alternative to current nickel-cadmium and nickel-metal hydride cells because they possess several attractive characteristics, e.g., high cell voltage, long shelf life, a wide operating temperature range, and use of non-toxic materials. The earliest reports of $LiNiO_2$ and $LiCoO_2$ as the positive electrode materials in rechargeable lithium batteries occurred more than a decade ago and are shown in, for example, U.S. Pat. Nos. 4,302,518 and 4,357,215 to Goodenough, et al.

These materials have been intensively investigated, and one of them, $LiCoO_2$ is currently used in commercial lithium ion batteries. Numerous patents have been issued for different improvements in these materials as the positive electrode for lithium cells. An example of a recent improvement is illustrated in U.S. Pat. No. 5,180,547 to Von Sacken for "HYDRIDES OF LITHIATED NICKEL DIOXIDE AND SECONDARY CELLS PREPARED THEREFROM". The Von Sacken reference teaches fabricating the hydroxides of lithium nickel dioxide fabricated in an atmosphere including a partial pressure of water vapor greater than about 2 torr.

Regardless of the particular material used in such cells, each material is synthesized in an oxidizing environment such as $O_2$ or air at temperatures higher than about 700° C. using nickel or cobalt and lithium containing salts. For example, a publication to Ohzuku, et al published in the Journal of the Electrochemical Society, Vol. 140, No. 7, Jul. 19, 1993, illustrates at Table 1 thereof, the typical processing methods for preparing $LiNiO_2$. Each of the methods illustrated in the Ohzuku, et al reference show preparing the material in an oxidizing environment of either oxygen or air.

Charge and discharge of the materials fabricated according to these processes proceeds by a charge mechanism of de-intercalation and intercalation of lithium ions from and into these materials. The materials synthesized by the prior art methods have a reversible capacity of about 135 mAh/g. In other words, about 0.5 lithium ions can be reversibly deintercalated and intercalated from and into each mole of $LiNiO_2$ or $LiCoO_2$.

A significant amount of the capacity of these materials resides at potentials higher than about 4.2 volts versus lithium. If more than 0.5 lithium ions is removed from each of either a $LiNiO_2$ or $LiCoO_2$ electrode, potentials higher than 4.2 volts versus lithium are required causing decomposition of most electrolytes. Further, removal of more than 0.5 lithium ions will result in irreversible changes in the structure of these materials, causing a decrease in their capacity during charge and discharge cycles. This result was reported in a publication by Xie, et al prepared at the Electrochemical Society Fall Meeting, 1994, Extended Abstract No. 102, Miami, October 1994.

The reversible capacities of the most commonly used materials synthesized in $O_2$ and air atmospheres are very sensitive to residual inactive lithium salts such as $Li_2O$, LiOH, and $LiCoO_3$, each of which result from the synthesis process. However, to make stoichiometric $LiNiO_2$, which is perceived to have the best performance of any of the prior art materials, excess lithium salt is normally used in precursor materials. As a result, the presence of residual lithium salt is inevitable in the final product fabricated according to prior art methods. In addition to causing a decrease in the capacity of $LiNiO_2$, the presence of residual lithium salts often causes gas evolution such as $CO_2$, $H_2$ and $O_2$ at the positive electrode during charging. Further, it is normally observed that the initial charge efficiency is much lower for $LiNiO_2$ (i.e., less than about 80%) than that for $LiCoO_2$ when the two materials are made in a similar fashion. In order to reduce these problems, manufacturers typically try to minimize or eliminate residual lithium salts from the product.

Accordingly, there exists a need to develop a new cathode material for rechargeable electrochemical systems, which is fabricated of materials which are relatively environmentally friendly, may be fabricated at relatively low temperatures and which demonstrate performance characteristics superior to those of the prior art. Specifically, such materials should have: (1) high capacity greater than 170 mAh/g at potentials between 3.5 and 4.2 volts; (2) an easy synthesis process which can be highly controlled; (3) insensitivity to residual lithium salts; (4) high initial charge efficiency; and (5) high reversible charge/discharge reactions so as to provide a material having good cycle life.

DETAILED DESCRIPTION OF THE PREFERRED EMBODIMENT

Figure 1:
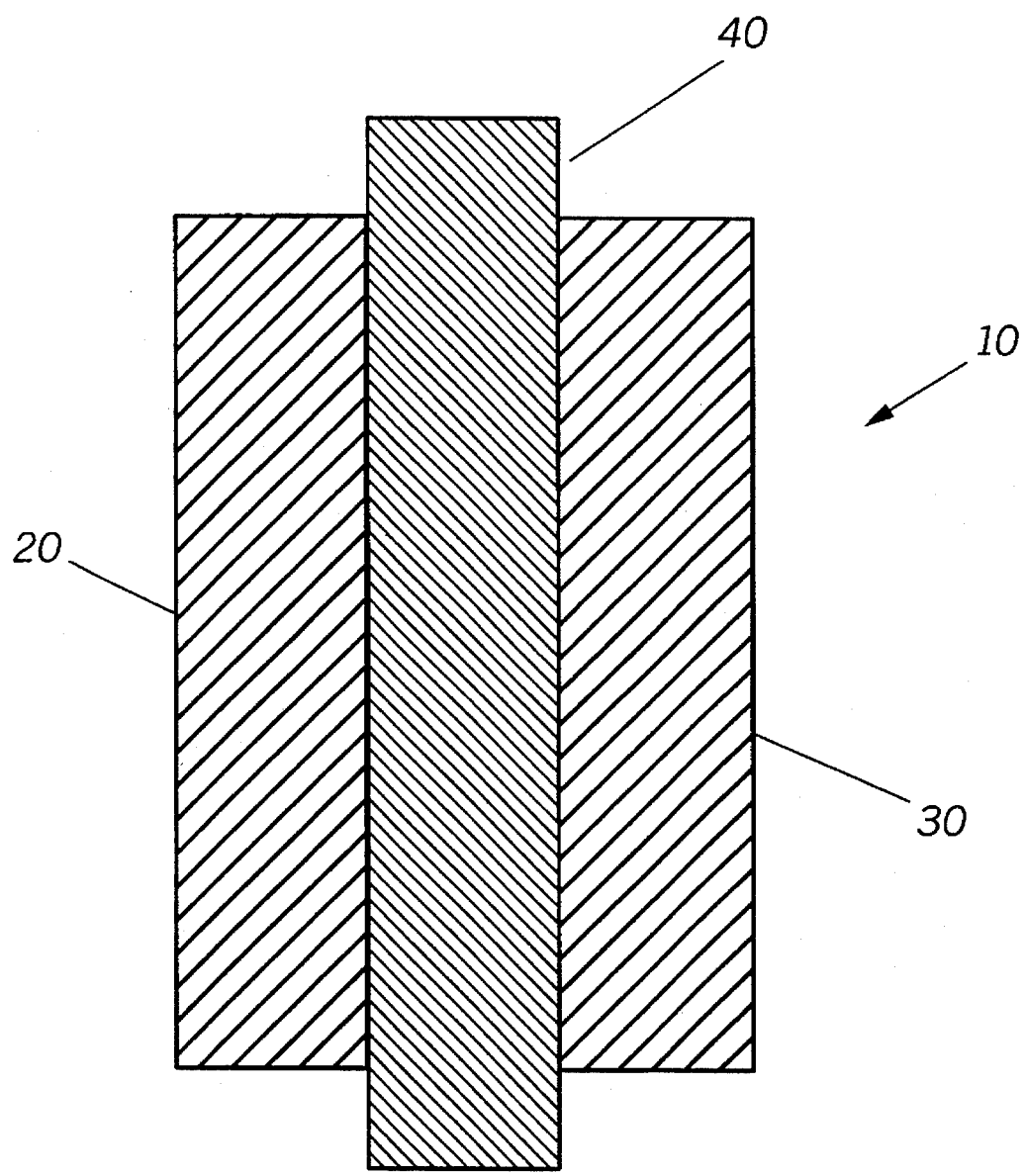
FIG. 1 is a schematic representation of an electrochemical cell including an electrode in accordance with the instant invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a schematic representation of an electrochemical cell 10 including a lithiated transition metal oxide electrode in accordance with the instant invention. The electrochemical cell includes a positive electrode 20 and a negative electrode 30 and has an electrolyte 40 disposed between said electrodes. The cell 10 further includes a positive electrode 20 fabricated of a transition metal oxide such as a nickel oxide or a cobalt oxide electrochemical charge storage material which is described in greater detail hereinbelow. The negative electrode 30 or anode of the cell 10 may be fabricated of materials selected from the group of materials consisting of, but not limited to, Li metal, Li alloying metals such as Al, Sn, Bi, carbon (including graphite and petroleum coke), low voltage Li intercalation compounds, such as $TiS_2$, $V_6O_{13}$, $MoS_2$, and combinations thereof. The electrolyte 40 disposed between the electrodes can be any of the electrolytes known in the art, including, for example, $LiClO_4$ in propylene carbonate or polyethylene oxide, impregnated with a lithiated salt. The electrolyte may be either a solid, gel, or aqueous electrolyte. The electrolyte 40 may also act as a separator between the positive and negative electrodes.

In accordance with the instant invention, there is provided a method for fabricating a lithiated transition metal oxide material which is capable of storing and discharging electrical charge. The material disclosed herein is therefore useful as, for example, the cathode in lithium rechargeable batteries. The stabilized material has the formula $LiTM_yO_2 \cdot Li_2O$ where TM is a transition metal selected from the group of Mn, Ni, Co, and combinations thereof; $0.05 \leq x \leq 1.0$; $y \geq 1.0$; and where $Li_2O$ may exist as a separate phase. The valence state of the TM may be less than the 3+ state. It is to be noted that $Li_2O$ may be tolerated in the instant material, and does not cause the deleterious effects observed in the prior art lithiated transition metal oxide cathode materials. The material may further include one or more modifiers selected from the group of Ti, Bi, Fe, Zn, Cr, and combinations thereof.

Figure 2:
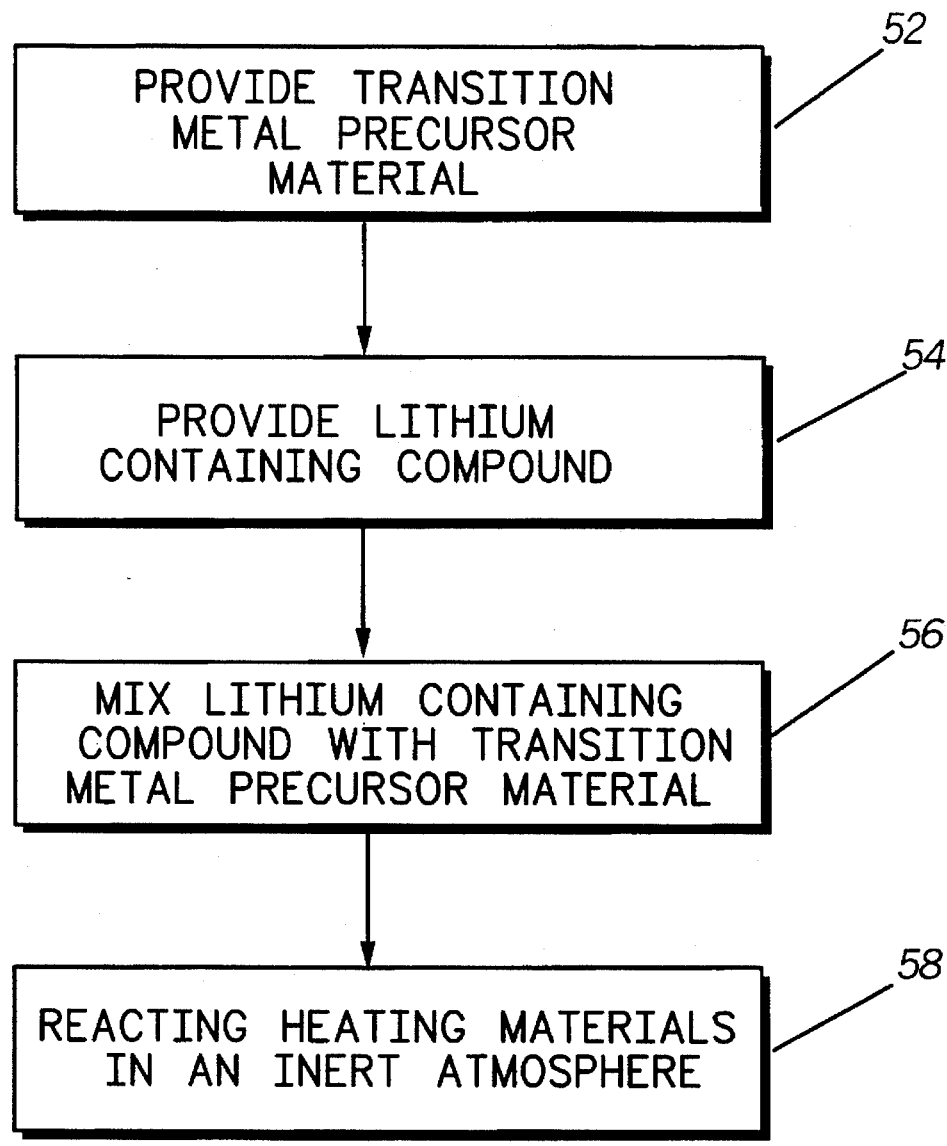
FIG. 2 is a flow chart illustrating the steps for preparing a lithiated transition metal oxide material in accordance with the instant invention.

Referring now to FIG. 2, there is illustrated therein a flowchart 50 describing the steps for preparing a lithiated transition metal oxide material in accordance with the instant invention. The first step in preparing the lithiated transition metal oxide material is illustrated in Box 52 of Flowchart 50. Box 52 recites the step of providing a transition metal precursor material. Precursor materials which may be used include, for example, first transition metal compounds such as $TM(OH)_2$, TMO, $TM(NO_3)_2$, and $TM(CO_2)$ where TM is a first transition metal, such as Co, Ni, or Mn. Specific examples of materials include, $Ni(OH)_2$, $Ni(NO_3)_2 \cdot 6H_2O$, NiO, $Co(OH)_2 \cdot Co(NO_3)_2 \cdot 6H_2O$, CoO, MnO, $Mn(OH)_2$, $Mn(NO_3)_2 \cdot 6H_2O$, $Mn_2O_3$, and combinations thereof. In one preferred embodiment, the transition metal precursor material is $Ni(OH)_2$. In a second preferred embodiment, the transition metal precursor material is $Co(OH)_2$.

The second step illustrated in Flowchart 50 is shown in Box 54 and comprises the step of providing a lithium containing compound. Examples of lithium-containing compounds include, for example, $LiNO_3$, LiOH, $Li_2O$, Li hydrocarbonate salts and combinations thereof. It is to be understood that in selecting the first transition metal precursor material and the lithium containing material, at least one of the them must include an oxidizing group, such as $NO_{3-}$ to provide an oxidizing agent for the reaction. In one preferred embodiment, the transition metal precursor material is $TM(OH)_2$, such as $Ni(OH)_2$, and the lithium containing material is $LiNO_3$, providing the required $NO_{3-}$ oxidizing agent. Thus, the reaction for this preferred combination is as follows:

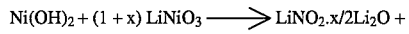

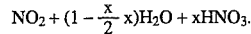

This combination is preferred because the transition metal hydroxide has a layered structure, and both $Ni(OH)_2 + LiNO_3$ can mix homogeneously, as $LiNO_3$ becomes liquids at temperatures above 260° C. Further, $Ni(OH)_2$ has a crystalline structure similar to that of $LiNiO_2$ (a layered structure) and does not go through a NiO phase before forming $LiNiO_2$. The transition metal precursor material and the lithium-containing compound are mixed together via conventional mixing techniques such as, for example, ball milling. This step is illustrated in Box 56 of Flowchart 50.

Thereafter, the materials are reacted, as by heating as illustrated in Box 58 of Flowchart 50. The conditions and environment in which the heating takes place is critical to forming a material having high capacity as illustrated herein. More particularly, the mixed materials are heated in an inert environment. By an inert environment, it is meant that the principle components of the atmosphere in which the heating takes place are not reactive with the materials therein. Accordingly, the heating illustrated in Step 58 of Flowchart 50 is carried out in a helium, nitrogen or argon environment. In one preferred embodiment, the heating generates reaction conditions, and takes place in a $N_2$ atmosphere, at temperatures between about 500° C.–800° C., and preferably between 600° C.–700° C. Heating continues for at least four and preferably at least ten hours. This is a substantial departure from the prior art which uniformly teaches the use of an oxidizing element to facilitate the activity of the oxidizing agent. Indeed, the prior art teaches away from any nonoxidizing environment.

Figure 3:
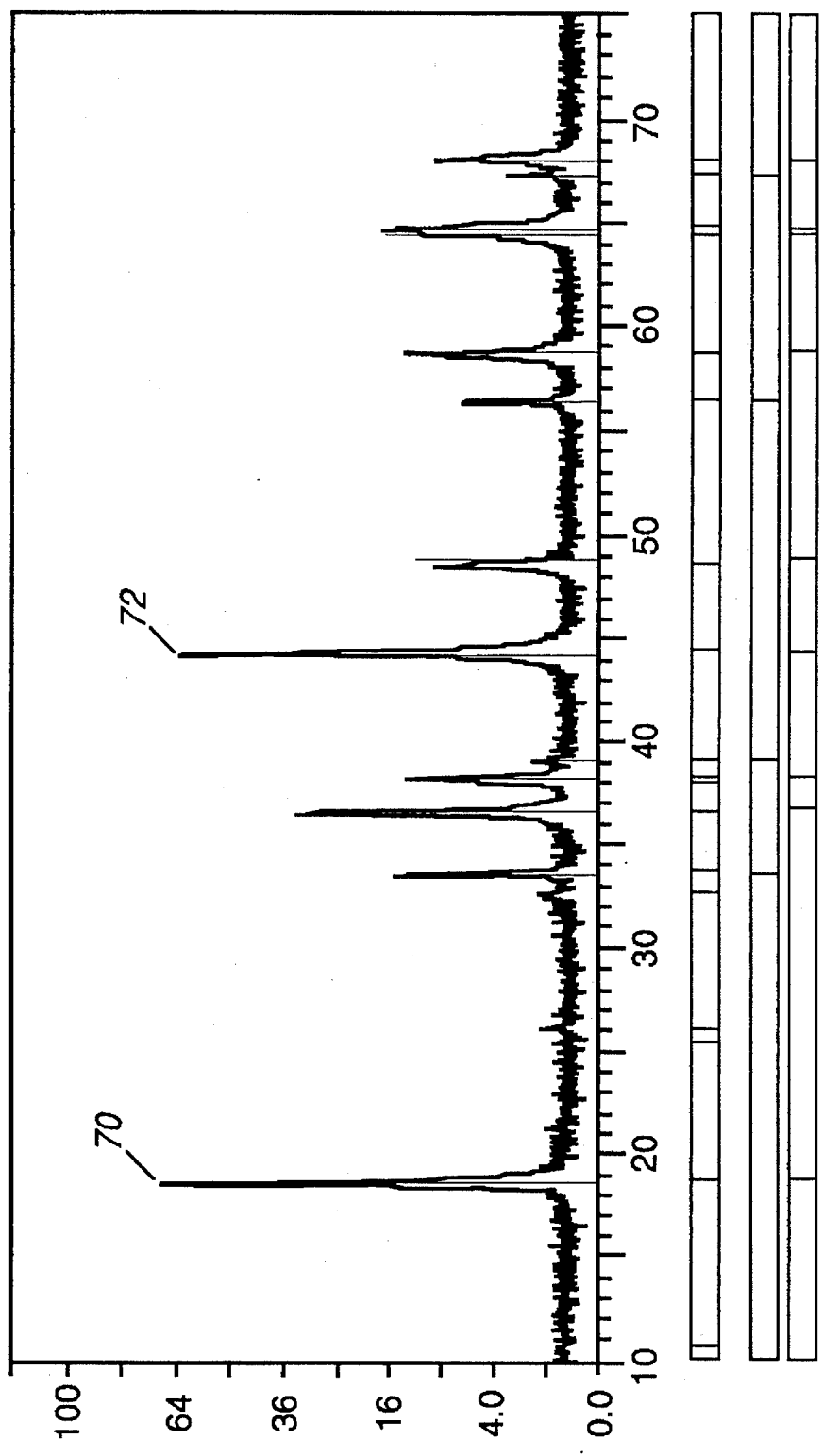
FIG. 3 is an x-ray diffraction pattern of a high capacity $LiNiO_2$ material fabricated in accordance with the instant invention.

There is an optimal reaction time for each temperature and for different ratios of $Ni^{2+}$ to $Li^+$ in the starting materials. The optimal reaction time can be determined by examining x-ray diffraction patterns of resulting materials. Specifically, the novel material resulting from the process described in FIG. 2 can be identified by its unique powder x-ray diffraction ("XRD") pattern. Specifically, the XRD pattern for a high capacity $LiNiO_2 \cdot 0.7Li_2O$ material in accordance with the instant invention is shown in FIG. 3. The XRD pattern has several peaks illustrated therein, though only two, identified as 70 and 72, are examined herein.

Peak 70 corresponds to an x-ray diffraction intensity at the degrees 2θ angle of approximately 18.7°, using $CuK\alpha_1$ as the x-ray source. Peak 72 corresponds to the x-ray diffraction intensity at the degrees 2θ of approximately 44.2°, again using a $CuK\alpha_1$ x-ray source. XRD patterns of prior art materials demonstrate a ratio between these peaks of no more than 1.40:1.00, and typically about 1.1:1.0. Conversely, the signature ratio of the instant high capacity material is at least 1.60:1.0 and may be considerably higher. This ratio is demonstrated in FIG. 3.

Accordingly, and contrary to the state of the art methods disclosed in the prior art, the synthesis of $LiNiO_2$ or $LiCoO_2$ can be accomplished through melt-solid reaction using an $NO_{-3}$ containing salt as the oxidizing agent in an inert environment such as helium or nitrogen at temperatures below 700° C. Materials made in an inert environment have higher reversible capacity and charge efficiency than those made by the conventional method, i.e., in air or oxygen. Further, the reversibility of the intercalation/deintercalation of these materials is better, as will be demonstrated hereinbelow.

The materials fabricated in accordance with the method described herein, demonstrates distinct differences in defined structures of XRD patterns, as described above. In addition to the differences illustrated in FIG. 3, materials fabricated according to the instant invention have a significantly different physical appearance as compared with conventional materials. Materials fabricated according to the instant invention have a deep black color, such as carbon black, and have a "slippery" consistency similar to that of graphite powder. Conversely, materials according to the prior art are gray in color and do not possess the "slippery" graphite-like feeling.

The invention may be better understood from the examples presented below:

EXAMPLES

Examples I

A lithiated transition metal oxide material was prepared in accordance with the instant invention. $Ni(OH)_2$ and $LiNO_3$ were provided in the molar ratio of 1.0:2.5, and mixed thoroughly in a ball mixer and pressed into a pellet. Thereafter the pellet was heated to 300° C. in helium for four hours, heated to 600° C. for 20 hours in helium, with two intermittent grinding and heating steps. The weight of the resulting product was consistent with $LiNiO_2.0.75Li_2O$. An XRD analysis of the material was conducted on the material and is illustrated in FIG. 3 described hereinabove. The XRD pattern of the material indicates that it contained $LiNiO_2$ and $Li_2O$ only.

Figure 4:
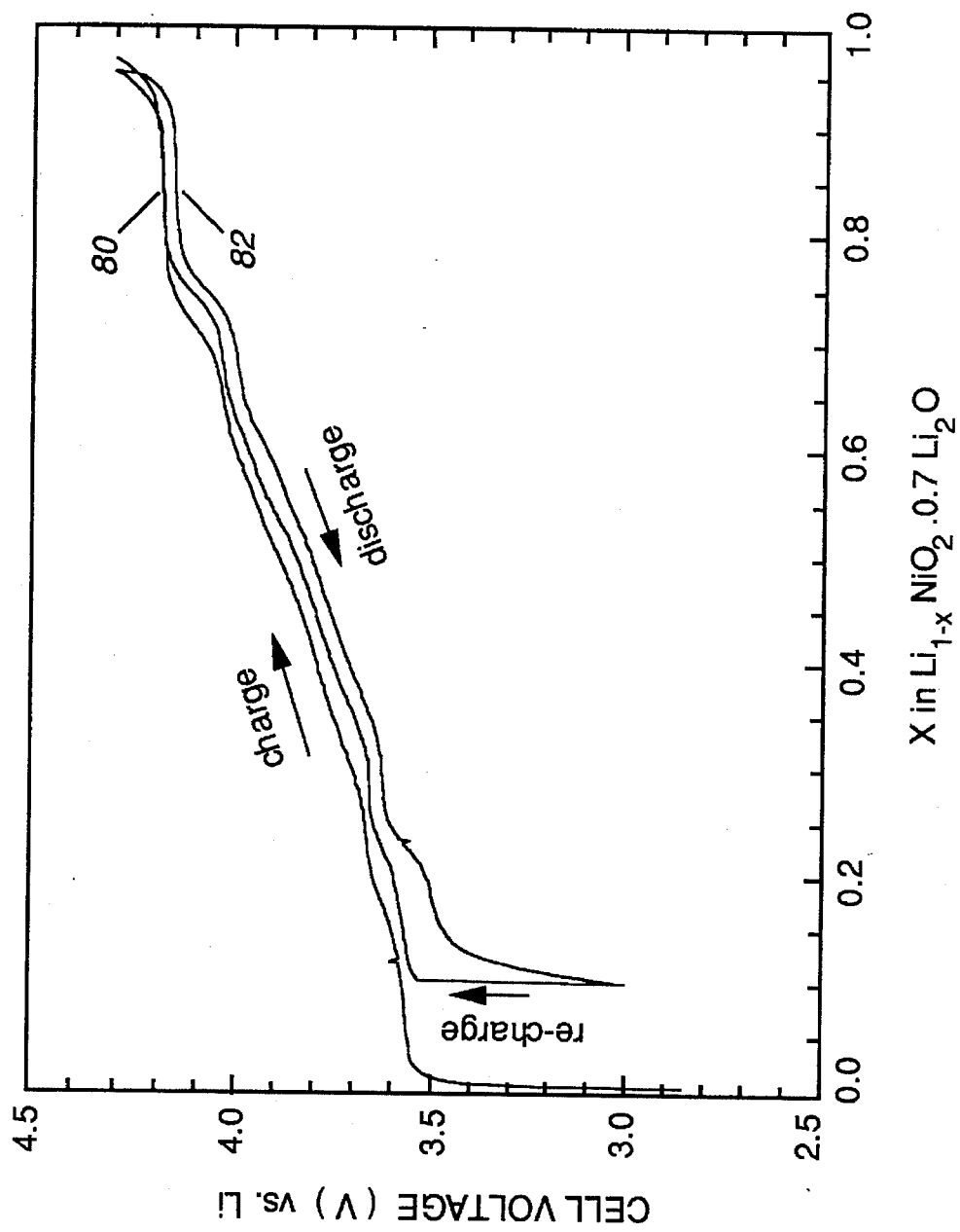
FIG. 4 is a charge/discharge profile for a high capacity $LiNiO_2$ material in accordance with the instant invention.

The electrochemical behavior of the material fabricated according to this example was evaluated in a test cell with 1M $LiPF_6$ in a solution of 50% ethylene carbonate and 50% dimethylethylene as the electrolyte and a lithium metal foil as the negative electrode (anode). The charge and discharge profiles of the cell voltage of the cell fabricated accordingly to this Example I is illustrated in FIG. 4 hereof. More specifically, it may be appreciated from FIG. 4, that nearly one lithium ion may be removed from each $LiNiO_2$ on charging at potentials below 4.2 volts and that approximately 0.9 lithium ion can be intercalated into the material for each nickel atom on discharge at a potential higher than about 3.0 volts.

It should be pointed out here that this material has the following characteristics that are different from those synthesized by a prior art method: 1. The peak ratio of the XRD intensity at the $2\theta$ angle of about 18.7° to that at 44.3° is greater than 1.6 as illustrated in FIG. 3, compared to less than 1.4 for those by a prior art method; 2. the existence of $Li_2O$ does not affect the charge and discharge capacity; and 3. there is a flat plateau near 4.2 on charge and a corresponding one on discharge for this material as illustrated at points 80 and 82 respectively in FIG. 4. No plateau is observed on the charge curve at this potential for materials synthesized by a prior art method.

Figure 5:
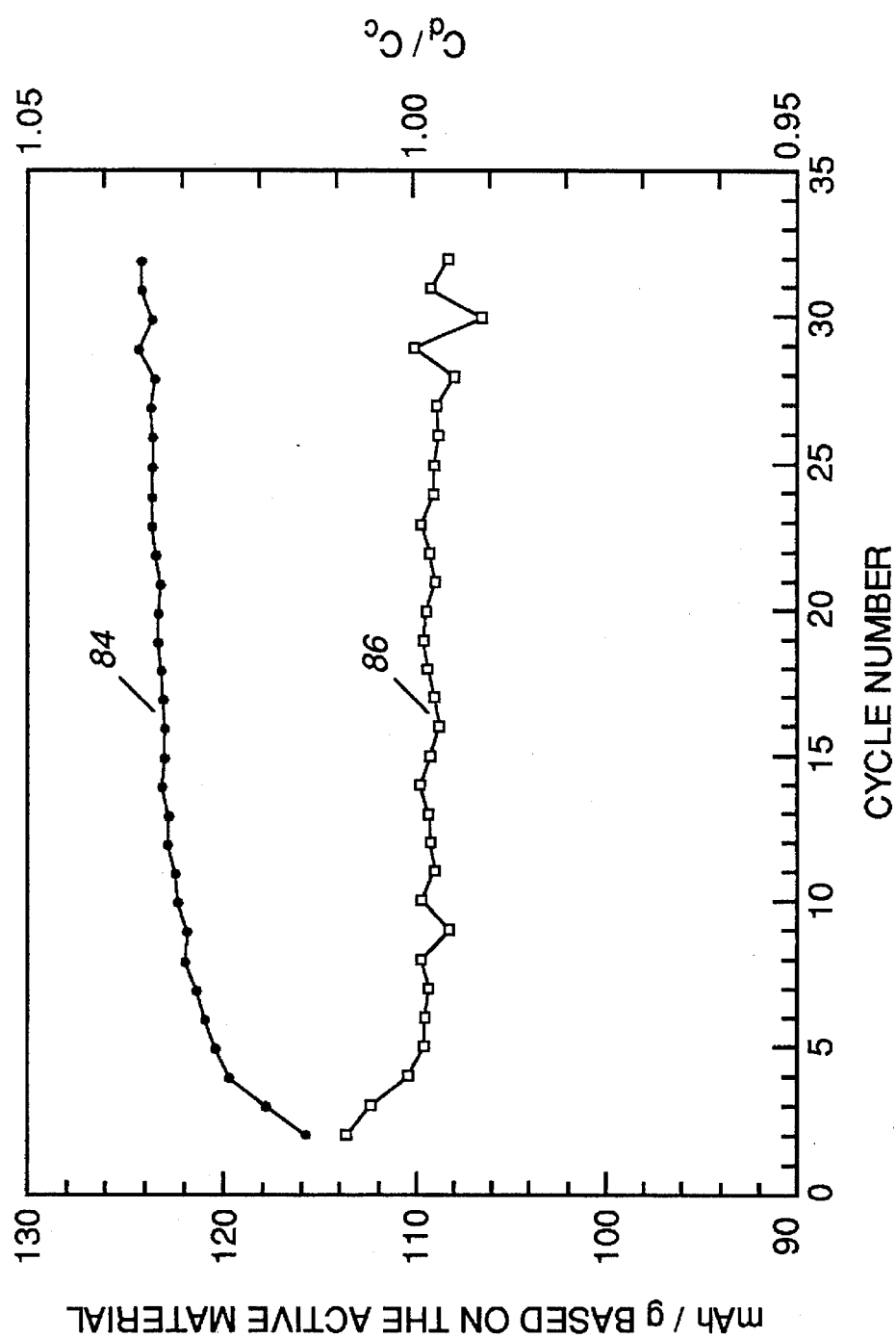
FIG. 5 is a chart illustrating the discharge capacity and charge efficiency of an electrochemical cell employing a positive electrode material in accordance with the instant invention.

Referring now to FIG. 5, there is illustrated therein the discharge capacity (line 84) and the charge efficiency (line 86) as a function of cycle life for a coin type cell using a lithiated nickel oxide material fabricated in accordance with the instant invention, as described in this Example I. The lithiated nickel oxide served as the positive electrode material and commercially available graphite was used as the negative material. The separator used in the cell was porous polypropylene and is commercially available under the name Celgard 2500®. The electrolyte used in the cell was 1M $LiPF_6$ in a mixture of ethylene carbonate, diethylene carbonate, and propylene carbonate. The cell was charged and discharged at a rate of about C/3. The mass ratio of the positive electrode material to the negative electrode material was approximately 2:1. As shown in FIG. 5, the capacity of the cell does not fade with increasing cycle number.

Example II $Ni(OH)_2$ and $LiNO_3$ were provided in the molar ratio of 1:1.05 and ground and mixed in a ball mill. The mixture was heated to 300° C. in air for 8 hours and then at 600° C. in air for 40 hours. The resulting product was ground and examined by x-ray diffraction. The XRD patterns indicated that the material consisted of $Li_2Ni_8O_{10}$ and $LiNO_3$, and demonstrated poor electrochemical properties. However, a similar mixture was converted completely into high capacity $LiNiO_2.Li_2O$ having a capacity greater than ~170 mAh/g within 18 hours when calcined in a helium environment at temperatures of 600° C. This example indicates that partial oxidation of $Ni^{2+}$, by $O_2$ in air slows decomposition of $LiNO_3$ as in the prior art method. A high capacity $LiNiO_2$ can be synthesized at a low temperature such as 600° C. in an inert environment, but cannot be made in air or $O_2$ at the same temperature.

Example III $Co(OH)_2$ and $LiNO_3$ were mixed in the molar ratio of 1:2.5 and ground and mixed in a ball mill. The mixture was heated to 300° C. in helium for 8 hours and then at 600° C. in helium for 20 hours. The resulting product was ground and examined using x-ray diffraction. The XRD patterns indicate that the material contained $LiCoO_2$ and $Li_2O$. The material also showed a capacity in excess of 140 mAh/g.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of fabricating a lithiated transition metal oxide electrochemical charge storage material, said method comprising the steps of:

providing a first transition metal precursor material; mixing said transition metal precursor material with a lithium containing compound wherein either said first transition metal precursor or said lithium containing compound includes an oxidizing agent; and heating the mixture of said first transition metal material and said lithium containing compound in an inert environment.

2. A method as in claim 1, wherein said inert environment is helium.

3. A method as in claim 1, wherein said inert environment is argon.

4. A method as in claim 1, wherein said inert environment is nitrogen.

5. A method as in claim 1, wherein said first transition metal precursor material is selected the group consisting of $Ni(OH)_2$, $Ni(NO_3)_2.6H_2O$, $NiO$, $Co(OH)_2$, $Co(NO_3)_2.6H_2O$, $CoO$, $MnO$, $Mn(OH)_2$, $Mn(NO_3)_2.6H_2O$, $Mn_2O_3$, and combinations thereof.

6. A method as in claim 1, wherein said oxidizing agent is $NO_{-3}$.

7. A method as in claim 1, wherein said mixture is heated into temperatures in excess of 300° C. for at least 10 hours.

8. A method as in claim 1, wherein said lithium containing compound is selected from the group of $LiNO_3$, $LiOH$, $Li_2O$, and combinations thereof.

9. A method as in claim 1, wherein said first transition metal precursor is $Ni(OH)_2$, and said lithium containing compound is $LiNO_3$.

10. A method as in claim 1, wherein said first transition metal precursor is $Co(OH)_2$, and said lithium containing compound is $LiNO_3$.

11. An electrochemical charge storage material having the formula:

$$LiTMyO_2 \cdot xLi_2O$$

wherein TM is a transition metal selected from the group of Ni, Co, and combinations thereof; $0.05 \leq x \leq 1$; $y \geq 1$; and wherein said material is characterized by an x-ray diffraction pattern, when taken with a $CuK\alpha_1$ x-ray source, in which the intensity ratio of the peak at the degree 2θ angle of approximately 18.7° versus the peak at the degree 2θ angle of approximately 44.2° is greater than 1.6:1.

12. A material as in claim 11, further including a modifier selected from the group of Ti, Bi, Fe, Zn, Cr, and combinations thereof.

13. A material as in claim 12, wherein said modifier is present in concentrations up to 20%.

14. A material as in claim 11, wherein said material is $LiNiO_2 \cdot xLi_2O$.

15. A material as in claim 11, wherein said material is $LiCoO_2 \cdot xLi_2O$.

16. An electrochemical cell comprising:

an anode;

an electrolyte; and a cathode fabricated of a material having the formula $$LiTMyO_2 \cdot xLi_2O$$

wherein TM is a transition metal selected from the group of Ni,Co, and combinations thereof; $0.05 \leq x \leq 1$; $y \geq 1$; and wherein said material is characterized by an x-ray diffraction pattern, when taken with a $CuK\alpha_1$ x-ray source, in which the intensity ratio of the peak at the degree 2θ angle of approximately 18.7° versus the peak at the degree 2θ angle of approximately 44.2° is greater than 1.6:1.

17. An electrochemical cell as in claim 16, wherein said cathode material further includes a modifier selected from the group of Ti, Bi, Fe, Zn, Cr, and combinations thereof.

18. An electrochemical cell as in claim 17, wherein said modifier is present in concentrations up to 20%.

19. An electrochemical cell as in claim 16, wherein said material is $LiNiO_2 \cdot xLi_2O$.

20. An electrochemical cell as in claim 16, wherein said material is $LiCoO_2 \cdot xLi_2O$.

21. An electrochemical cell as in claim 16, wherein said electrolyte is aqueous.

22. An electrochemical cell as in claim 16, wherein said electrolyte is solid.

23. An electrochemical cell as in claim 16, wherein said anode is fabricated of a material selected from the group of Li metal, Li alloying metals such as Al, Sn, Bi, carbon, $TiS_2$, $V_6O_{13}$, $MoS_2$, and combinations thereof.

* * * * *